Oct. 20, 1959 W. J. SHIBE, JR 2,909,551
DISILOXANE ESTER ETHERS
Filed Aug. 20, 1956
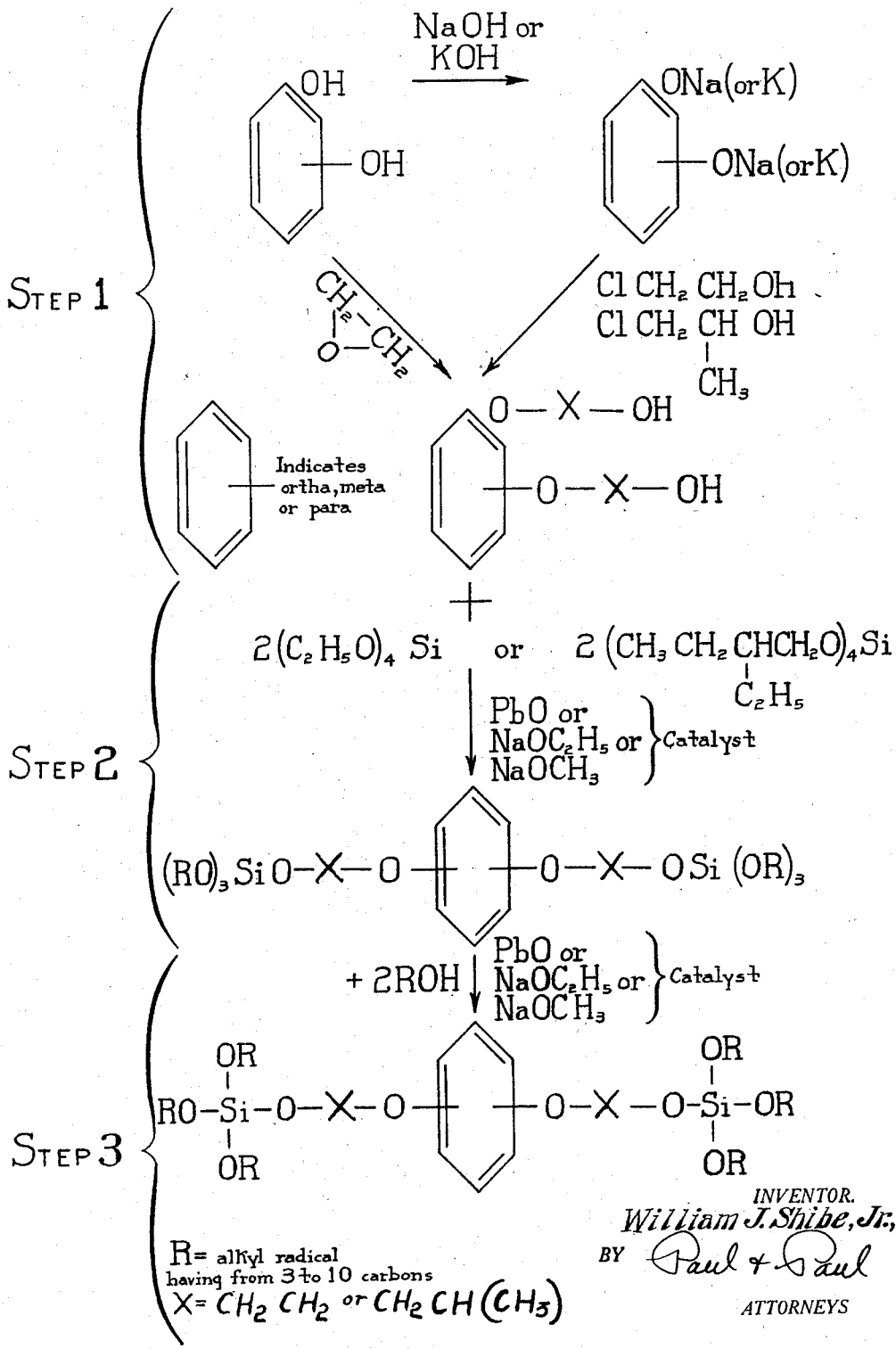
INVENTOR.
*William J. Shibe, Jr.*,
BY *Paul & Paul*
ATTORNEYS

United States Patent Office 2,909,551
Patented Oct. 20, 1959

2,909,551

DISILOXANE ESTER ETHERS

William J. Shibe, Jr., Riverton, N.J., assignor to R. M. Hollingshead Corporation, Camden, N. J., a corporation of New Jersey Application August 20, 1956, Serial No. 605,034

12 Claims. (Cl. 260—448.8)

This invention relates to disiloxane ester ethers and to their production and, particularly, to phenoxy disiloxane ester ethers in which the silicon linkages are remotely located from the aromatic nucleus and consist of ester linkages rather than silicon to carbon linkages.

The compounds of the present invention are useful as intermediates in the preparation of siloxanes. The disiloxane ester ethers of the present invention are particularly useful as thickening agents for silicate ester fluids and as lubricating agents for high temperature fluids.

The present invention relates broadly to compounds of the type:

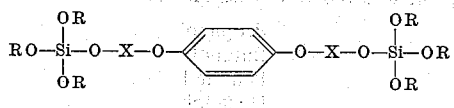

in which X is $CH_2CH_2$ or $CH_2CH(CH_3)$ and R is an alkyl radical having from three to ten carbon atoms. The alkyl radicals comprising R may be alike or unlike. The position on the benzene ring may be ortho, meta or para as indicated by the lines extending inside the benzene ring.

Compounds corresponding to the above are prepared according to the present invention by forming the dialkanol ether of a dihydroxy benzene (catechol, resorcinol or hydroquinone), converting the dialkanol ether thus obtained to a simple silicate ether, and then converting the simple silicate ether to an ester ether in which the outer alkyl groups have from 3 to 10 carbons. The individual steps for specific examples of the process of this invention are hereinafter set forth in detail.

EXAMPLE 1

*Step 1.—Preparation of dialkanol ether of dihydroxy benzene*

114 grams of hydroquinone are dissolved in one liter of water containing 115 grams of KOH. This material is placed in a round-bottom flask equipped with an agitator, a dropping funnel and a reflux condenser. 177 grams of ethylene chlorohydrin are then added to the flask contents, dropwise, with agitation. The batch is then refluxed for two hours and allowed to cool. The product, hydroquinone diethanol ether, is separated out as a crystalline material, and is further purified by recrystallizing from a one n-KOH solution.

*Step 2.—Preparation of a simple silicate ether from the dialkanol ether of Step 1*

450 grams of ethyl silicate are placed in a round-bottom flask equipped with a high speed agitator with a mercury seal and a 30″ packed column with a condenser. 198 grams of hydroquinone diethanol ether are then added to the contents of the flask. 5 mls. of a 10% solution of sodium methoxide are then added as a catalyst. The batch is then agitated and slowly brought up to 80° C. Two moles of ethanol are removed from the reaction mixture through the column and the flask contents are stripped under reduced pressure to remove any unreacted ethyl silicate.

*Step 3.—Transesterification of simple silicate ether to higher disiloxane ester ether*

580 grams (6.6 moles) of secondary amyl alcohol are added to one mole of the simple silicate ether of Step 2. 5 mls. of a 10% solution of sodium methoxylate in methanol is then added using the equipment described in Step 2, and, with vigorous agitation, the reaction mixture is brought to the boil. Six moles of ethanol (275 grams) are removed in this step through the column. The reaction mixture is then stripped of any unreacted low boilers such as amyl alcohol or methanol. The reaction mixture is then washed with water to remove the catalyst. It is then dried with anhydrous magnesium sulfate and decolorized with fuller's earth.

The final product obtained by carrying out the process described above consists of para phenylene dioxy bis (trisecondary amoxy ethoxy silane) which has the following structural formula:

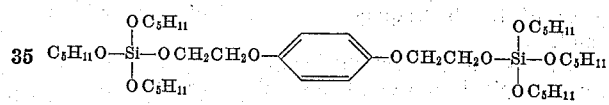

EXAMPLE 2

*Step 1.*—114 grams of hydroquinone are dissolved in one liter of water containing 115 grams of KOH. This material is placed in the same equipment as in Example 1, Step 1, and then 200 grams of propylene chlorohydrin are added and the product is purified as in Example 1, Step 1. The product is separated out as a crystalline material and is further purified as in Example 1. The product, hydroquinone di propanol ether, is represented by the following formula:

*Step 2.*—900 grams of tetra 2 ethyl butyl silicate is placed in a round bottom flask equipped as in Step 2 of Example 1.

212 grams of hydroquinone di propanol ether is then added to the contents of the flask. 5 mls. of a 10% solution of sodium methoxide is then added as a catalyst.

2 moles of 2 ethyl butanol are removed from the reaction mixture through the column after which the reaction mixture is partly distilled under reduced pressure to remove any excess tetra 2 ethyl butyl silicate. The product thus obtained is represented by the following formula:

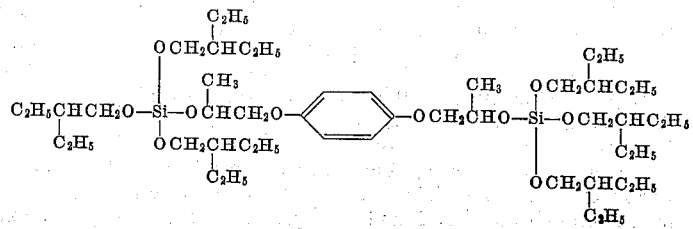

*Step 3.*—To the product obtained from Step 2, 260 grams of 2-octanol are added and the reaction mixture heated to remove 2 moles of 2 ethyl butanol. The product is then heated under reduced pressure to remove any unreacted octanol or 2 ethyl butanol. The product is then purified as outlined in Step 3 of Example 1 yielding paraphenylene dioxy bis (di 2 ethyl butoxy, 2 octoxy, isopropoxy silane).

EXAMPLE 3

*Step 1.*—Same as in Example 2.
*Step 2.*—Same as in Example 2.
*Step 3.*—4 moles (520 grams) of 2-octanol are added to the product obtained from Step 2 and the reaction mixture is then heated to remove four moles (408 grams) of 2 ethyl butanol. The product is then heated under reduced pressure to remove any unreacted octanol or 2 ethyl butanol. The product is then purified as outlined in Step 3 of Example 1. The final product consists of para phenylene dioxy bis (di 2 octoxy, 2 ethyl butoxy, isopropoxy silane) and corresponds to the following formula:

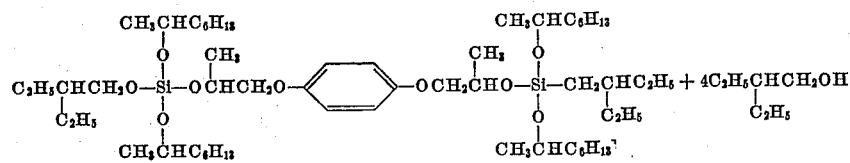

EXAMPLE 4

*Step 1.*—114 grams of resorcinol are dissolved in one liter of water containing 115 grams of KOH. The procedure of Step 1 of Example 1 is then followed to produce resorcinol di ethanol ether.

*Step 2.*—The procedure of Step 2 of Example 2 is followed using 198 grams of resorcinol di ethanol ether in place of the hydroquinone di propanol ether of Example 2.

*Step 3.*—The product obtained from Step 2 of the present example is processed as in the case of Step 3 of Example 2.

The final product of Example 4 consists of meta phenylene dioxy bis (di 2 ethyl butoxy, 2 octoxy, ethoxy silane), and corresponds to the following formula:

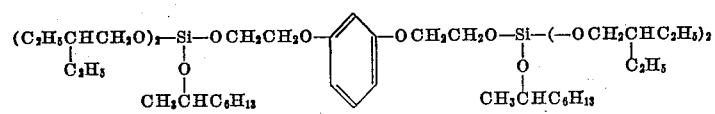

EXAMPLE 5

*Step 1.*—114 grams of resorcinol are dissolved in one liter of water containing 115 grams of KOH. The procedure of Step 1 of Example 2 is then followed.

*Step 2.*—The procedure of Step 2 of Example 2 is followed using the product obtained in Step 1 above.

*Step 3.*—The product of Step 2 above is processed according to the procedure of Step 3 of Example 3. The final product of Example 5 is meta phenylene dioxy bis (di 2 octoxy 2 ethyl butoxy isopropoxy silane) and corresponds to the following

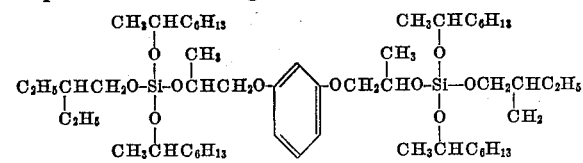

EXAMPLE 6

*Step 1.*—One mole (110 grams) of hydroquinone is dissolved in water and placed in a flask as in Step 1 of Example 1. Two moles (44 grams) of ethylene oxide are then added following the procedure of Step 1 of Example 1. The remaining steps of Example 1 are followed through Steps 1, 2 and 3 in producing the same end product, namely para phenylene dioxy bis (tri secondary amoxy ethoxy silane).

EXAMPLE 7

The procedure of Example 6 is carried out starting with one mole (110 grams) of resorcinol.

EXAMPLE 8

The procedure of Example 6 is carried out starting with one mole (110 grams) of catechol. As shown in the drawing accompanying this application a dihydroxy benzene may be the starting material or the sodium or potassium salt of a dihydroxy benzene may be formed. In the case of direct conversion of the dihydroxy benzene to the dialkanol ether the process employs ethylene oxide whereas in the case of the alkali metal salt the process employs either ethylene chlorohydrin or propylene chlorohydrin. Likewise, in the conversion of the dialkanol ether to a simple silicate ether in Step 2, either ethyl silicate or ethyl butyl silicate may be used. Similarly, there are a number of alcohols which may be used in carrying out the transesterification process of Step 3. These include the following alcohols and their isomers:

Propanol
Butanol
Pentanol
Hexanol
Heptanol
Octanol
Nonanol
Decanol

The group of catalysts set forth in Step 2 of the drawing is repeated in Step 3 for the sake of clarity but in actual practice the catalyst selected for use in carrying out Step 2 is still present in the proper amount at the time Step 3 is performed.

In lieu of including in a repetitive manner the carrying out of the steps of the process of the present invention as applied to the very large number of variations in separate examples, the various alternative materials have been identified in the specification and in the drawing of the present application with the intent that they be looked upon as constituting examples of the process and of the products obtainable thereby.

Having thus described my invention, I claim:

1. Disiloxane ester ethers having the formula:

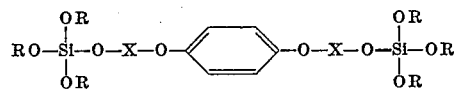

in which R is an alkyl radical having from 3 to 10 carbons and X is selected from the group consisting of $CH_2CH_2$ and $CH_2CH(CH_3)$.

2. Paraphenylene dioxy bis (di 2 ethyl butoxy, 2 octoxy, isopropoxy silane).

3. Paraphenylene dioxy bis (di 2 octoxy, 2 ethyl butoxy, isopropoxy silane).

4. Meta phenylene dioxy bis (di 2 ethyl butoxy, 2 octoxy, ethoxy silane).

5. Meta phenylene dioxy bis (di 2 octoxy 2 ethyl butoxy isopropoxy silane).

6. Paraphenylene dioxy bis (tri secondary amoxy ethoxy silane).

7. In a process for making disiloxane ester ethers having the general formula:

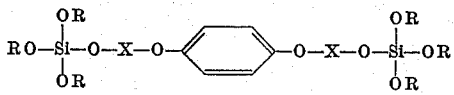

wherein R is an alkyl radical having from three to ten carbons and X is selected from the group consisting of $CH_2CH_2$ and $CH_2CH(CH_3)$, the steps including reacting about 2 moles of ethylene oxide with about 1 mole of a dihydroxy benzene selected from the group consisting of catechol, hydroquinone and resorcinol to form a dialkanol ether of dihydroxy benzene, reacting about one mole of the said dialkanol ether with about two moles of an organic silicate selected from the group consisting of ethyl silicate and ethyl butyl silicate to form a silicate ether, and reacting said silicate ether with a monohydroxy alkanol containing 3 to 10 carbon atoms to form a disiloxane ester ether.

8. In a process for making disiloxane ester ethers having the general formula:

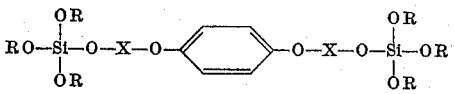

wherein R is an alkyl radical having from three to ten carbons and X is selected from the group consisting of $CH_2CH_2$ and $CH_2CH(CH_3)$, the steps including reacting an alkali metal salt of a dihydroxy benzene selected from the group consisting of catechol, hydroquinone and resorcinol with a chlorohydrin selected from the group consisting of ethylene chlorohydrin and propylene chlorohydrin, the said alkali metal being selected from the group consisting of sodium and potassium, to form a dialkanol ether of dihydroxy benzene, reacting about 1 mole of the said dialkanol ether with about 2 moles of an organic silicate selected from the group consisting of ethyl silicate and ethyl butyl silicate to form a silicate ether, and reacting said silicate ether with a monohydroxy alkanol containing 3 to 10 carbon atoms to form a disiloxane ester ether.

9. The process defined in claim 7 wherein the dialkanol ether is hydroquinone diethanol ether, the disiloxane ester ether is para phenylene dioxy bis (tri secondary amoxy ethoxy silane), the organic silicate is ethyl silicate and the alkanol is secondary amyl alcohol.

10. The process defined in claim 8 wherein the dialkanol ether is hydroquinone di propanol ether, the disiloxane ester ether is para phenylene dioxy bis (di 2 ethyl butoxy, 2 octoxy, isopropoxy silane), the chlorohydrin is propylene chlorohydrin, the organic silicate is tetra 2 ethyl butyl silicate and the alkanol is 2-octanol.

11. The process defined in claim 8 wherein the dialkanol ether is resorcinol diethanol ether, the disiloxane ester ether is meta phenylene dioxy bis (di 2 ethyl butoxy, 2 octoxy, ethoxy silane), the chlorohydrin is ethylene chlorohydrin, the organic silicate is tetra 2 ethyl butyl silicate and the alkanol is 2-octanol.

12. The process defined in claim 8 wherein the dialkanol ether is resorcinol di propanol ether, the disiloxane ester ether is meta phenylene dioxy bis (di 2 octoxy 2 ethyl butoxy isopropoxy silane), the chlorohydrin is propylene chlorohydrin, the organic silicate is tetra 2 ethyl butyl silicate and the alkanol is 2-octanol.

References Cited in the file of this patent

UNITED STATES PATENTS

| | | |
|---|---|---|
| 2,327,053 | Marple et al. | Aug. 17, 1943 |
| 2,630,446 | Gresham | Mar. 3, 1953 |
| 2,724,698 | Kittleson | Nov. 22, 1955 |
| 2,776,307 | Abbott et al. | Jan. 1, 1957 |

OTHER REFERENCES

Volnov et al.: "Jour. Gen. Chem. (USSR)," vol. 10, pages 550–6 (1940).

Shukis et al.: "Jour. Amer. Chem. Soc.," vol. 66 (1944), pp. 1461–2.

George et al.: Ibid, vol. 75 (1953), page 987.